US008574692B2

(12) United States Patent
McKillip et al.

(10) Patent No.: US 8,574,692 B2
(45) Date of Patent: Nov. 5, 2013

(54) METALLIZED SHRINKABLE LABEL

(75) Inventors: Barron G. McKillip, Mickelton, NJ (US); Ulrich E. Weyermann, Bethany Beach, DE (US); Daniel B. Chaffee, Levittown, PA (US)

(73) Assignee: Sancoa International Company, L.P., Lumberton, NJ (US)

( * ) Notice: Subject to any disclaimer, the term of this patent is extended or adjusted under 35 U.S.C. 154(b) by 544 days.

(21) Appl. No.: 12/295,635

(22) PCT Filed: Apr. 10, 2007

(86) PCT No.: PCT/US2007/066279
§ 371 (c)(1),
(2), (4) Date: Dec. 12, 2008

(87) PCT Pub. No.: WO2007/121152
PCT Pub. Date: Oct. 25, 2007

(65) Prior Publication Data
US 2009/0176123 A1 Jul. 9, 2009

Related U.S. Application Data

(60) Provisional application No. 60/744,757, filed on Apr. 13, 2006.

(51) Int. Cl.
*B32B 37/14* (2006.01)
*B65B 53/02* (2006.01)

(52) U.S. Cl.
USPC ............ 428/34.9; 156/84

(58) Field of Classification Search
USPC ......... 156/84; 101/483, 492, 450.1; 428/40.1, 428/40.9, 41.1, 41.2, 41.6, 42.1, 343, 346, 428/544, 545, 573, 539.5, 34.9
See application file for complete search history.

(56) References Cited

U.S. PATENT DOCUMENTS 4,745,014 A * 5/1988 Hanaya et al. ............... 428/34.9
5,190,609 A 3/1993 Lin et al. ............... 156/85
6,127,024 A 10/2000 Weiss et al. ............... 428/204
6,248,427 B1 6/2001 Ast
6,303,233 B1 10/2001 Amon et al. ............... 428/516
6,908,687 B2 6/2005 Mendes et al. ............... 428/516

FOREIGN PATENT DOCUMENTS

EP 0122495 10/1984

OTHER PUBLICATIONS

Supplementary European Search Report of corresponding EP 07760358.7, Feb. 22, 2011, EPO.
JP 63037931 with translation AN 1988-087648 XP002621932, Feb. 18, 1988, JP.
JP 5035874 with translation AN 1993-203339 XP002621933, May 27, 1993, JP.

(Continued)

*Primary Examiner* — Patricia Nordmeyer
(74) *Attorney, Agent, or Firm* — McCarter & English, LLP

(57) ABSTRACT

The present invention is a metallized shrinkable label and a method for producing the same. The label of the invention is composed of a shrinkable film base and a graphic. The graphic is created by combining pigmented inks, a metallic coating and a shrink-resistant coating which is printed in a predetermined pattern with gaps so that upon exposure of the label to heat, the gaps close thereby forming a continuous graphic layer. Advantageously, the shrink-resistant coating minimizes discoloration and pleating of the metallic coating.

3 Claims, 2 Drawing Sheets

(56) References Cited

OTHER PUBLICATIONS

JP 2592608 with translation AN 1997-168657 XP002621934, Mar. 19, 1997, JP.
JP 4311432 with translation AN 1992-418113 XP002621935, Nov. 4, 1992, JP.
Examination Report dated Feb. 14, 2012, issued in connection with Mexican Patent Application No. Mx/a/2008/013142 (9 pages).
Office Action dated Feb. 7, 2011, issued in connection with Canadian Patent Application No. 2,648,941 (2 pages).
Office Action dated Mar. 23, 2010, issued in connection with Canadian Patent Application No. 2,648,941 (2 pages).
Written Opinion mailed on Aug. 7, 2008, issued in connection with International Application No. PCT/US2007/066279 (3 pages).
International Search Report of the International Searching Authority mailed on Aug. 7, 2008, issued in connection with International Application No. PCT/US2007/066279 (3 pages).

* cited by examiner

METALLIZED SHRINKABLE LABEL

This patent application is the National Stage of International Application No. PCT/US2007/066279, filed Apr. 10, 2007, which claims the benefit of priority from U.S. Application Ser. No. 60/744,757 filed Apr. 13, 2006, each of which are herein incorporated by reference in their entirety.

BACKGROUND OF THE INVENTION

In displaying and selling packaged goods, it is generally important to apply visible markings such as product identifiers, instructional material, corporate logos, trademarks and the like to the visible portions of a container for commercial purposes such as sales promotion of the goods packaged in the container. Such visible markings are generally applied directly to the visible portions of a container by various techniques including printing, embossing, etching and the like either directly onto the side walls of the container or by attaching to the container a film or wrapper having the visible markings thereon.

Various types of printed films and methods for labeling packaged goods are used throughout the packaging industry. For example, U.S. Pat. No. 6,908,687 teaches oriented or hot-blown shrink films containing a modifier component such as a plastomer and/or metallocene catalyzed ethylene-propylene copolymer, wherein the label can be coated or metallized.

U.S. Pat. No. 5,190,609 discloses a stable pressure sensitive shrink label. The heat shrink labels are formed from a polyolefin, such as a polypropylene, and have a permanent acrylic pressure-sensitive adhesive on one side. A metallized layer and open style graphics are disclosed, wherein the graphics may be protected by varnish or a second layer of heat shrinkable polyolefin material.

U.S. Pat. No. 6,303,233 discloses an uniaxially heat-shrinkable, biaxially oriented, multilayer film having a polypropylene-containing core layer, wherein metal coatings can be deposited on the multilayer film structure without the development of any noticeable crazing of the metal upon shrinking.

U.S. Pat. No. 6,127,024 discloses a battery label having a single heat-shrinkable polymeric layer, a graphic layer composed of a printed metallized layer or an ink layer, and a UV cured, heat, electron beam, or polymerized varnish layer having geometric patterns on the two linearly extending edges that correspond to the portion of the label that extends beyond and wraps around the rims of the battery.

EP 0122495 discloses films of biaxially oriented polypropylene laminated to an olefin polymeric film. The films are used as decorative wrapping paper having a metallized surface laminated thereon.

SUMMARY OF THE INVENTION

The present invention is a metallized shrinkable label composed of a shrinkable film base with a graphic applied to at least a portion of the lower surface of the shrinkable film. The graphic of the instant label is composed of a metallic coating and a shrink-resistant coating, wherein the shrink-resistant coating is printed in a predetermined pattern with defined gaps. Some embodiments embrace the shrink-resistant coating applied on the lower surface of the metallic coating, whereas other embodiments embrace the metallic coating applied on the lower surface of the shrink-resistant coating. In further embodiments, the metallized shrinkable label contains a pigmented ink applied to at least a portion of the lower surface of the shrinkable film base or the shrink-resistant coating. Methods for producing a metallized shrinkable label of the present invention are also provided.

DETAILED DESCRIPTION OF THE INVENTION

Using conventional methods, metallized shrink films discolor when subjected to the heat required to shrink the film onto a container or product. It has now been found that discoloration is minimized when a shrink-resistant protective coating is used in combination with a metallic coating. In particular, when the shrink-resistant protective coating is applied to the metallic coating in a predetermined pattern with defined gaps and heat is applied to shrink the film, the gaps in the pattern close to produce substantially continuous protective and metallic coating layers without pleating, folding or overlapping. Accordingly, the present invention is a metallized shrinkable label and method of manufacturing the same.

Figure 1:
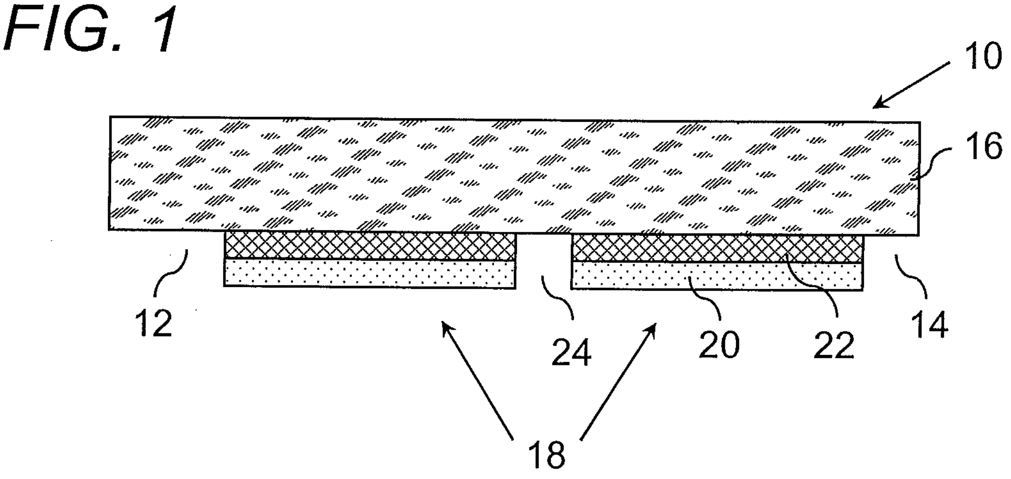
FIG. 1 is a cross-sectional view of a metallized shrinkable label 10 composed of a translucent shrinkable film base 16, a shrink-resistant coating 22 printed on a portion of the lower surface of the translucent shrinkable film base 16, and a metallic coating 20.

FIG. 1 illustrates a cross-sectional view of one embodiment of the metallized shrinkable label 10 of the present invention. A label is used herein in the conventional sense to refer to a tag applied to a surface, e.g., with or without adhesive, so as to identify the object or its contents. Labels of the instant invention are applied to the surface of a container (i.e., not a component of the container itself) to provide product identifiers, product source/manufacturer identifiers, bar codes, nutritional information, decoration, and the like. Generally, the metallized shrinkable label of the invention is of a length that its leading end 12 overlaps its trailing end 14 and a seam is formed at the overlap so that the label wraps around a container or product.

Metallized shrinkable label 10 is composed of translucent shrinkable film base 16 with graphic 18 applied on at least a portion of the lower surface of the shrinkable film base 16. A graphic is intended to include, patterns (e.g., diamonds, circles, squares, etc.), images, text, barcodes and the like which cover 1% to 100% of the total surface area of the label when applied to a container or product. Graphic 18 is composed of a metallic coating 20 combined with shrink-resistant protective coating 22 as shown in FIGS. 1 and 2.

Figure 2:
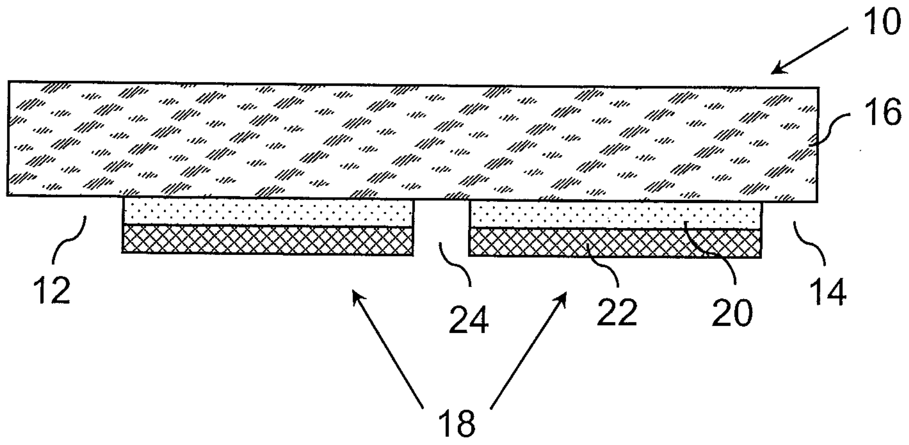
FIG. 2 is a cross-sectional view of a metallized shrinkable label 10 composed of a translucent shrinkable film base 16, a metallic coating 20 printed on a portion of the lower surface of the translucent shrinkable film base 16, and a shrink-resistant coating 22.

In one embodiment, graphic 18 is created by applying metallic coating 20 to the lower surface of shrinkable film base 16 and applying shrink-resistant protective coating 22 in a predetermined pattern with defined gaps 24 onto the lower surface of metallic coating 20 (FIG. 2). In an alternative embodiment, metallic coating 20 is applied to the lower surface of shrink-resistant coating 22, which is printed in a predetermined pattern with defined gaps 24 on the lower surface of the shrinkable film base 16 (FIG. 1). In this embodiment, shrink-resistant coating 22 is applied in a predetermined pattern in the areas of shrinkable film base 16 which encompass graphic 18 so that the uncoated portion of shrinkable film base 16 will shrink upon exposure to heat.

For the purposes of the present invention, the term "upper" is used to describe the layer which would be on the outer surface of a container (e.g., tube or bottle) or product when metallized shrinkable label 10 is applied as a label. As such, the term "lower" refers to the surface which would be in contact or adjacent to the container or product.

Shrinkable film base 16 can be a single ply or multi ply material that exhibits shrinkage up to sixty percent (60%) at temperatures exceeding, e.g., one hundred forty degrees Fahrenheit (140° F. or 60° C.). Suitable materials for use as shrinkable film base 16 include, but are not limited to, the polyvinyl chloride (PVC), polystyrene, polyethylene, PETG (glycol modified PET polymer) and polyolefin families of shrink film bases which provide a wide range of physical and performance film characteristics. Film characteristics play an important role in the selection of a particular film and may differ for each type of packaging or labeling application. Thus, the particular shrinkable film base employed is readily selected by the skilled artisan based on the container or product and end use thereof.

Shrink-resistant coating 22 can be composed of any clear, printable polymer material which exhibits minimal shrinkage and protects metallic coating 20 from discoloration. In particular embodiments, shrink-resistant coating 22 has three characteristics which are distinct from the varnish-style protective coatings known in the art. In one embodiment, shrink-resistant coating 22 is surfactant-free. Generally, varnishes have surfactants as part of the formula, since the purpose of a varnish is to protect the surface and simultaneously provide a surface which will allow the package to slide through subsequent processing equipment, e.g., guide rails, conveyors, etc. The instant shrink-resistant coating lacks surfactants, however, provides a "mirror-like" smooth surface to promote flow and adhesion of other inks to be printed thereon.

In another embodiment, shrink-resistant coating 22 significantly reduces the haze value of the label. Generally, shrink sleeve films have a haze factor which negatively affects the sheen of reverse-printed reflective inks such as metallic inks. The instant shrink-resistant coating causes a significant reduction in the haze factor, hence enhancing reflective appearance and sheen of metallic coatings.

In a further embodiment, shrink-resistant coating 22 retards shrinkage of under- or over-printed metallic coatings at the selective areas at which the shrink-resistant coating is printed. Since reflective inks such as metallic inks lose luster and sheen upon shrinking, the instant shrink-resistant coating effectively retains the high sheen of the reflective ink. Accordingly, a shrink-resistant or shrink-retardant protective coating as used herein is a coating that exhibits reduced shrinkage upon exposure to the heat required to shrink a shrinkable film base. Suitable shrink-resistant coatings include solvent-based, water-based or curable coating materials including epoxies, urethanes, acrylates, acrylics, and derivatives and combinations thereof which can be printed in a predetermined pattern with gaps onto the lower surface of shrinkable film base 16 or metallic coating 20. In particular embodiments, shrink-resistant coating 22 is applied or printed in predetermined patterns (e.g., diamonds, squares, bars, crosses, etc) using conventional printing techniques such as offset, letter press, gravure, silk screen, flexography, digital or combinations thereof.

Because shrink-resistant coating 22 is printed in discrete locations, i.e., patterns with gaps, the uncoated gaps 24 of the pattern close when the film base shrinks, thereby forming a continuous or substantially continuous graphic layer on the lower surface of shrinkable film base 16. See FIG. 3. In this regard, shrink-resistant coating 22 creates apertures or translucent areas through which metallic coating 20 has a higher reflectivity when viewed from the front of the label.

Figure 3:
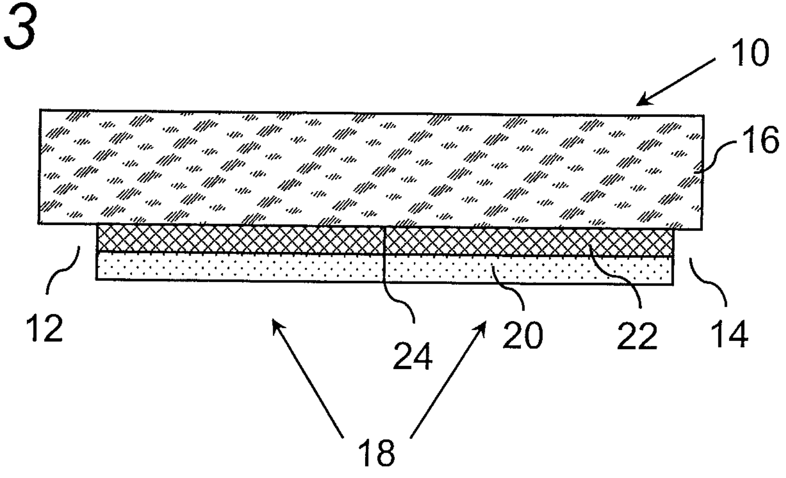
FIG. 3 is a cross-sectional view of a metallized shrinkable label 10 which has been shrunk so that the gaps 24 between patterns of shrink-resistant coating 22 are closed.
Figure 4:
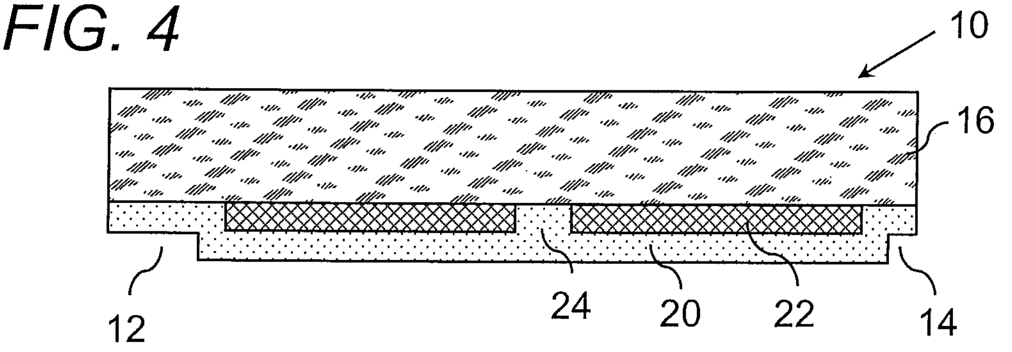
FIG. 4 is a cross-sectional view of a metallized shrinkable label 10 composed of a translucent shrinkable film base 16, a shrink-resistant coating 22 printed on a portion of the lower surface of the translucent shrinkable film 16, and a metallic coating 20 applied to the entire lower surface of film base 16.

In some embodiments, metallic coating 20 is applied only on surfaces printed with shrink-resistant coating 22 (see FIGS. 1-3). In other embodiments, metallic coating 20 is applied over the entire lower surface of shrinkable film base 16, including areas printed with shrink-resistant coating 22 as well as gaps 24 and/or ends 12,14 (see FIG. 4).

Metallic coating 20 can be any typical metal including, but not limited to, aluminum, copper, silver or chromium. Particularly suitable metallic coatings include metallic inks such as a Mirasheen™ inks and high reflective index coatings such as an aluminum coating, wherein the metal is applied by a conventional printing method or applied by a vacuum metallization and de-metallization process. Advantageously, coating a vacuum-metallized graphic area with a shrink-resistant coating protects the sheen; without such a coating, the metal crazes up and a considerable amount of sheen is lost.

Figure 5:
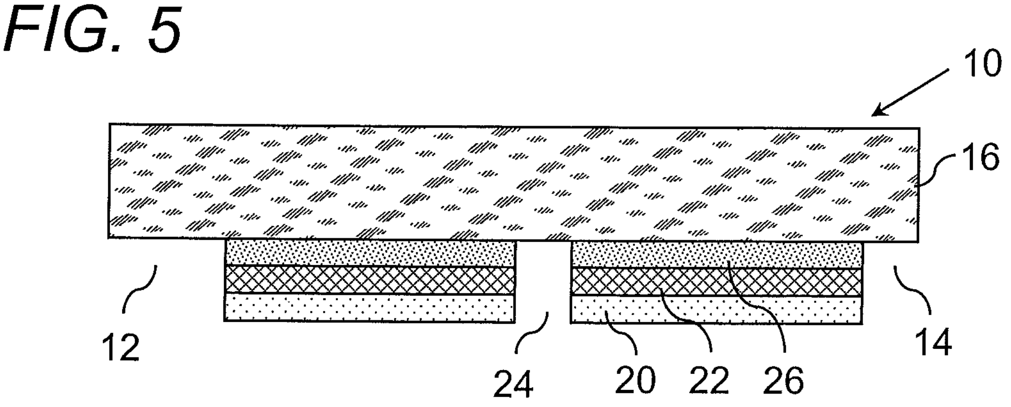
FIG. 5 is a cross-sectional view of a metallized shrinkable label 10 composed of a translucent shrinkable film base 16, a pigmented ink 26 printed on a portion of the lower surface of the translucent shrinkable film base 16, shrink-resistant coating 22, and metallic coating 20.
Figure 6:
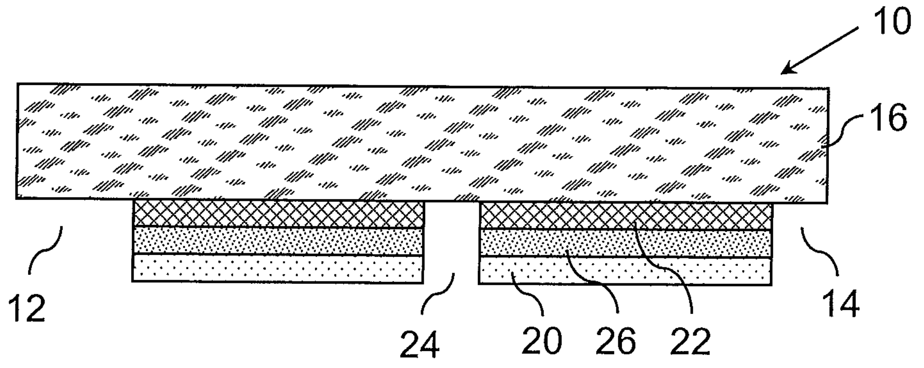
FIG. 6 is a cross-sectional view of a metallized shrinkable label 10 composed of a translucent shrinkable film base 16, a shrink-resistant coating 22 printed on a portion of the lower surface of the translucent shrinkable film base 16, pigmented ink 26, and metallic coating 20.

In particular embodiments, metallized shrinkable label 10 further has a pigmented coating or ink 26 applied to at least a portion of the lower surface of shrinkable film base 16 (FIG. 5) or shrink-resistant coating 22 (FIG. 6) thereby creating a colored metallized graphic.

The metallized shrinkable label of the present invention can be supplied on rolls, sheets or die-cut for use on a variety of articles of manufacture including containers (e.g., squeeze tubes, bottles, cans, and the like) for consumable or purchased goods or products such as personal care products (e.g., soaps, shampoos, make-up, insect repellents, and the like); first aid products (e.g., ointments, sunscreens, and the like); cleaners (e.g., detergents and cleaning solutions); paints; and foodstuffs (e.g., yogurt, cheese-like products, jelly, and the like). In some embodiments, the label is removable, i.e., not adhered to the surface of the container product. In other embodiments, the label is secured to the article by adhesive, e.g., between the leading end of the label and the container and by adhesive between the overlapping leading end and trailing end of the label. This method is a significant improvement in the manufacture of metallized shrinkable labels because the product label is not discolored during the application and shrinking process thereby enhancing the package appearance.

What is claimed is:

1. A metallized shrinkable label comprising a shrinkable film base with a graphic applied to at least a portion of the lower surface of the shrinkable film, wherein the graphic comprises:

(a) a metallic ink or coating printed on the shrinkable film base by offset, letter press, gravure, silk screen, flexography, digital techniques or a combination thereof, and (b) a shrink-resistant epoxy, acrylate or acrylic coating, and wherein the metallic coating and shrink-resistant coating are printed in an identical predetermined pattern with defined gaps within the metallic coating and shrink-resistant coating.

2. A method for producing a metallized shrinkable label comprising applying a shrink-resistant epoxy, acrylate or acrylic coating and metallic ink or coating, in an identical predetermined pattern with defined gaps within the metallic ink or coating and shrink-resistant epoxy, acrylate or acrylic coating, on at least a portion of the lower surface of a shrinkable film base; wherein the metallic coating is printed by offset, letter press, gravure, silk screen, flexography, digital techniques or a combination thereof on the lower surface of the shrink-resistant epoxy, acrylate or acrylic coating thereby producing a metallized shrinkable label.

3. A method for producing a metallized shrinkable label comprising applying a metallic ink or coating and shrink-resistant epoxy, acrylate or acrylic coating on at least a portion of the lower surface of a shrinkable film base; wherein the shrink-resistant epoxy, acrylate or acrylic coating and metallic ink or coating are printed by offset, letter press, gravure, silk screen, flexography, digital techniques or a combination thereof in an identical predetermined pattern with defined gaps within the metallic ink or coating and shrink-resistant epoxy, acrylate or acrylic coating, and wherein the shrink-resistant epoxy, acrylate or acrylic coating is on the lower surface of the metallic ink or coating thereby producing a metallized shrinkable label.

* * * * *